Oct. 23, 1956　　T. C. DINGMAN ET AL　　2,767,571
MOTOR VEHICLE LUGGAGE COMPARTMENT LOCK
Filed Jan. 28, 1953　　2 Sheets-Sheet 1
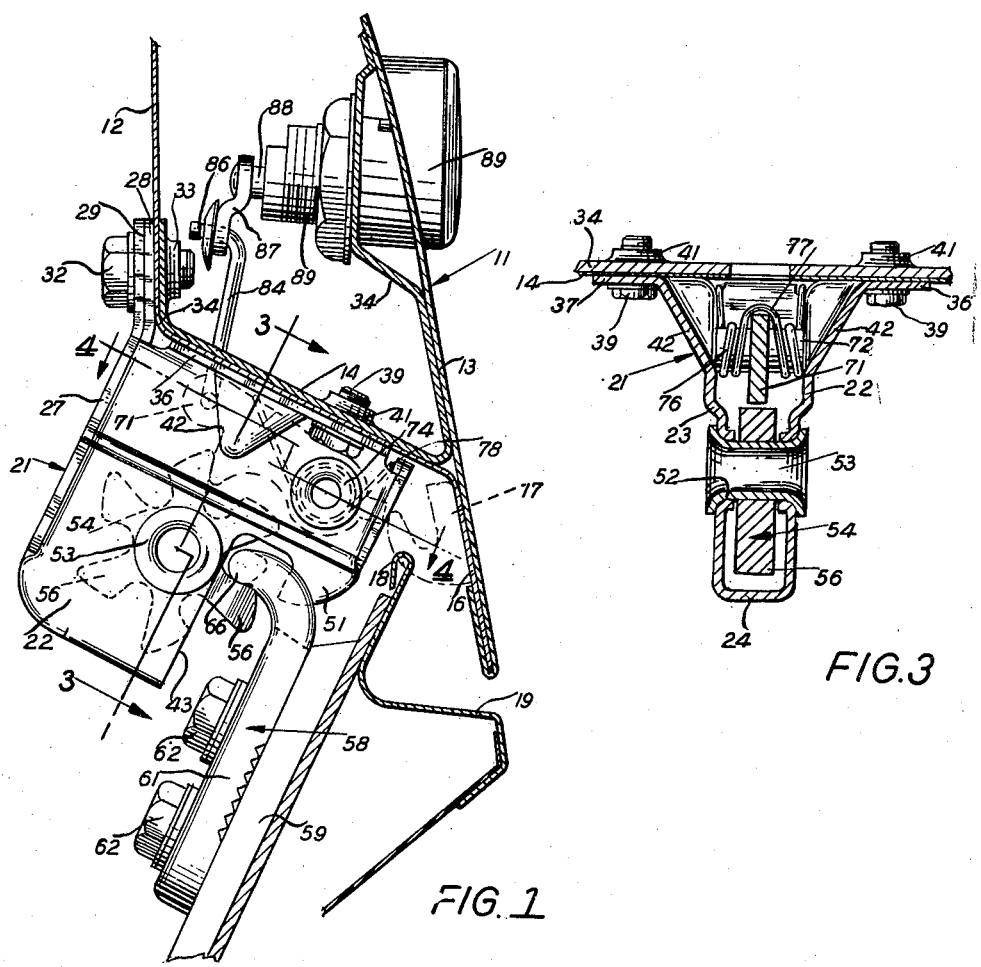
FIG. 1
FIG. 3
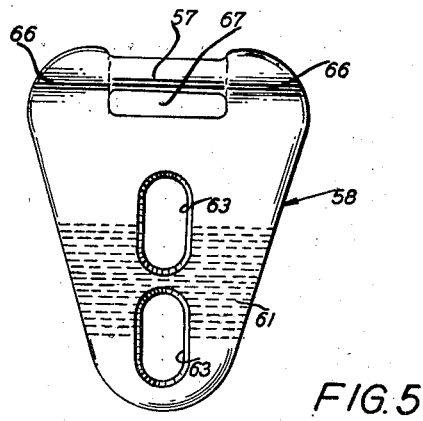
FIG. 5
T.C. DINGMAN
E.F. COOK
INVENTORS
BY
ATTORNEYS Oct. 23, 1956  T. C. DINGMAN ET AL  2,767,571
MOTOR VEHICLE LUGGAGE COMPARTMENT LOCK
Filed Jan. 28, 1953  2 Sheets-Sheet 2
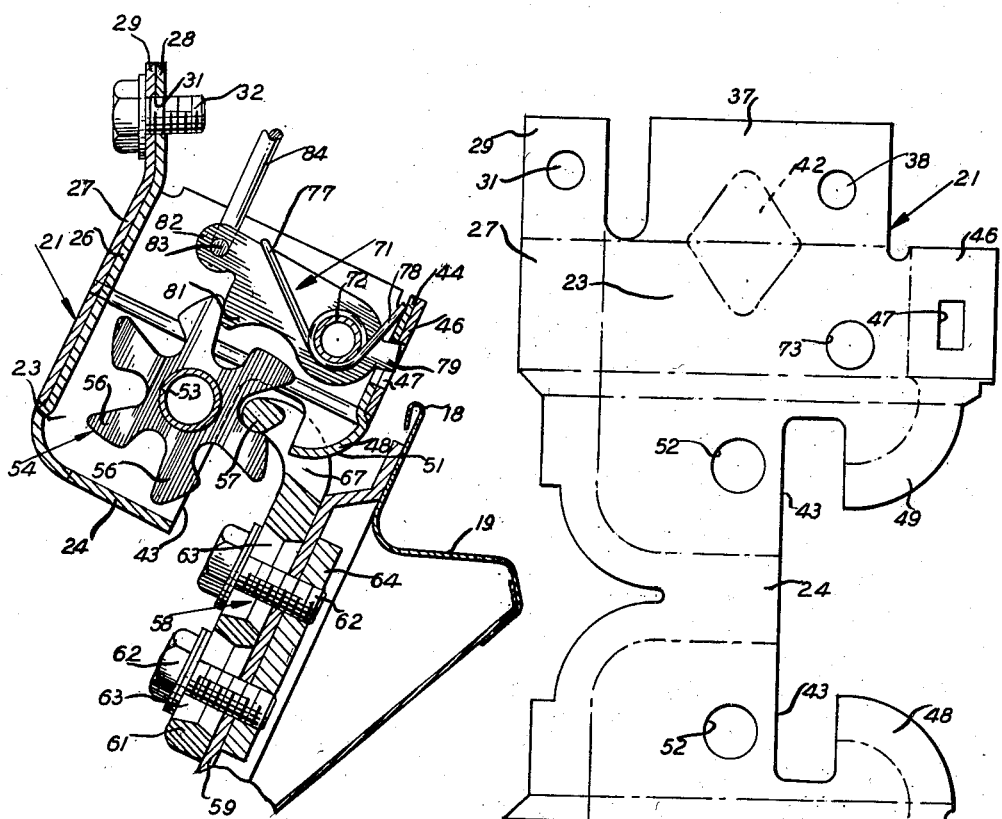
FIG. 2
FIG. 4
FIG. 6
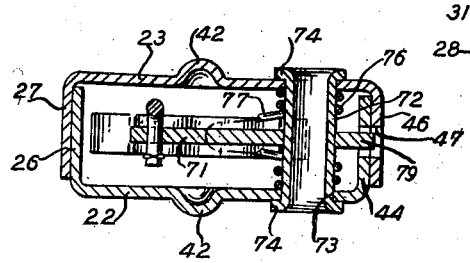
T. C. DINGMAN
E. F. COOK
INVENTORS
BY E. C. McRae
J. R. Faulkner
J. H. Oster
ATTORNEYS

United States Patent Office 2,767,571
Patented Oct. 23, 1956

2,767,571
MOTOR VEHICLE LUGGAGE COMPARTMENT LOCK

Thomas C. Dingman, Dearborn, and Ernest F. Cook, Detroit, Mich., assignors to Ford Motor Company, Dearborn, Mich., a corporation of Delaware Application January 28, 1953, Serial No. 333,688

3 Claims. (Cl. 70—139)

This invention relates generally to latch mechanisms for doors and particularly to latch mechanisms of the rotatable bolt type for use in connection with motor vehicle luggage compartment lids.

An object of the invention is to provide an improved latch mechanism for a motor vehicle luggage compartment lid, which comprises a minimum number of easily fabricated parts so as to provide an economically manufactured and assembled mechanism. The latch mechanism includes a rotor pivotally mounted within a housing secured to the lower portion of the luggage compartment lid. The housing is particularly designed to thwart unauthorized release of the latch mechanism, and is completely enclosed except for a relatively small slot through which a single tooth of the rotor projects for engagement by a striker mounted upon a fixed body part. The striker is designed with a horizontal striker bar movable within the slot in the housing for engagement with the rotor, and has supporting portions cooperating with the housing to bar access to the rotor in an unauthorized effort to force open the latch mechanism. A pivotally mounted pawl within the housing cooperates directly with the rotor and is controlled by means of linkage actuated by a key operated lock cylinder to unlock and unlatch the mechanism.

Other objects and advantages of this invention will be made more apparent as this prescription proceeds, particularly when considered in connection with the accompanying drawings, wherein:

Figure 1 is a vertical sectional view taken longitudinally through the rearward portion of a motor vehicle body showing the latching and locking mechanism of the present invention primarily in side elevation.

Figure 2 is a view similar to a portion of Figure 1 but with the housing broken away and in section to show the parts therein.

Figure 3 is a cross sectional view taken on the line 3—3 of Figure 1.

Figure 4 is a section taken on the line 4—4 of Figure 1.

Figure 5 is an elevational view of the striker.

Figure 6 is a plan view of the sheet metal blank used to form the housing for the latch mechanism.

The drawings illustrate the latching and locking mechanisms of the present invention as applied to the luggage compartment lid of an automobile body and arranged for direct release by means of a key controlled device, but it will be understood that it can also be operated by a manually operated handle.

The reference character 11 indicates the luggage compartment door of an automobile body. The door comprises inner and outer panels 12 and 13 respectively, the inner panel 12 having an outwardly extending flange 14 forming an end wall of the door and terminating in a downwardly extending marginal flange 16 suitably secured to the lower edge of the outer door panel 13. A flexible rubber strip 17, shown in phantom in its free position in Figure 1, is suitably cemented to the flange 16 in position to engage the upper rolled edge 18 of the rocker panel 19 secured to and extending upwardly from the rearward portion of the floor panel (not shown) of the luggage compartment.

The reference character 21 indicates a sheet metal housing secured to the luggage compartment door 11. The housing is formed from a single sheet metal stamping which is shown in Figure 6 in its flat condition before being bent on the dot-dash lines as indicated to form an enclosed housing. The housing extends generally longitudinally of the vehicle and has side walls 22 and 23 integrally joined by a web 24 forming a bottom wall for the housing. Flanges 26 and 27 extend from the side walls 22 and 23 respectively of the housing and are bent at right angles to the side walls to overlap each other and form the forward end wall of the housing. The upper end portions 28 and 29 of the flanges 26, 27 respectively project upwardly above the side walls of the housing and formed with aligned apertures 31 receiving a bolt 32 which passes through the inner door panel 12 and is threaded into an embossment 33 formed upon the reinforcing plate 34. The reinforcing plate 34 conforms generally to the shape of the lower portion of the luggage compartment door 11 and reinforces the latter to form a rigid mounting for the latch housing 21.

Extending upwardly and bent laterally outwardly from the side walls 22 and 23 of the housing are a pair of flanges 36 and 37. The flanges 36 and 37 are adjacent the end wall 14 of the luggage compartment door and have apertures 38 formed therein to receive bolts 39 passing through the end wall and into threaded embossments 41 formed on the reinforcing plate 34. Thus it will be seen that the latch housing 21 is rigidly mounted upon and secured to the lower portion of the reinforced luggage compartment door. The housing is laterally stiffened by means of triangular embossments or webs 42 between the side walls 22 and 23 and the upper flanges 36 and 37.

It will be noted that the side walls 22 and 23 of the housing are cut away at 43 to provide an elongated opening enabling the striker to engage a rotor mounted within the housing as is more fully described hereinafter.

Marginal flanges 44 and 46 extend from the side walls 22 and 23 of the housing and are bent at right angles into overlapping relationship with each other to form the rearward wall of the housing. Aligned rectangular openings 47 are formed in the flanges 44 and 46 for a purpose which will be apparent later. The overlapping flanges 44 and 46 are welded together as are the overlapping flanges 26 and 27 at the forward end of the housing. Beneath the marginal flanges 44 and 46 are integral arcuate flanges 48 and 49 respectively. These flanges are narrower in width so that when bent at right angles on the dot-dash lines in Figure 6 the flanges will abut each other. They are welded together in this position to form an enclosed shield 51.

Referring to Figure 6, it will be noted that circular openings 52 are formed in the side walls of the housing 21 in position to be horizontally aligned when the housing is formed. A sleeve 53 extends through these aligned openings and forms a bearing for a rotatable rotor 54 mounted within the housing between the side walls 22 and 23 thereof. As best seen in Figures 1 and 2, the rotor 54 is formed with six angularly spaced teeth 56.

The teeth 56 of the rotor are formed and positioned so as to be engaged by the upper bar 57 of a striker 58 mounted upon an inclined embossed reinforcement 59, the latter being secured at its upper end to the rocker panel 19 and its lower end to the luggage compartment floor (not shown). The striker 58 has a flat body portion 61 engageable with the adjacent surface of the embossed reinforcement 59 and is provided with serrations engaging the surface of the reinforcement to prevent slippage. Bolts 62 extend through elongated openings 63 in the striker and are threaded into a tapped plate 64 to lock the striker to the reinforcement yet permit a vertical adjustment thereof. The upper portion of the striker is formed with laterally spaced bifurcations 66 which are curved upwardly and forwardly from the body portion of the striker. The bifurcations 66 are joined by the integral bar 57, the latter extending horizontally. It will be noted from Figures 2 and 5 that an opening 67 is thus provided between the bifurcations 66 and between the body portions 61 and the bar portion 57 of the striker.

Figures 1 and 2 show the rotor and striker in the latched positions and it will be noted that the bar portion 57 of the striker extends into the slot 43 formed in the housing and is positioned forwardly of the shield portion 51 of the housing. The bifurcations 66 of the striker straddle the opposite sides of the shield portion 51 of the housing and cooperate therewith to bar access to the rotor or other mechanism within the housing by the unauthorized insertion of a tool between the lower portion of the luggage compartment door and the adjacent portion of the rocker panel. Thus, even though a special tool were inserted, the enclosed downwardly depending shield portion 51 of the housing in cooperation with the adjacent bifurcated portions 66 of the striker would effectively prevent any unauthorized tampering with the latch mechanism from being successful.

The rotor 54 is held from clockwise rotation as viewed in Figures 1 and 2 by means of a pawl 71. The pawl 71 is rotatably mounted upon a sleeve 72, as best seen in Figure 4. The sleeve 72 is mounted in aligned openings 73 formed in the opposite side walls of the housing 21. The opposite ends of the sleeve are flanged over as at 74 to retain the sleeve against lateral displacement. A spring 76 encircles the sleeve 72 and has a bight portion 77 engageable with the upper surface of the pawl 71 to continually urge the latter in a counterclockwise direction as seen in Figures 1 and 2. The opposite end 78 of the spring is engageable with flange 44 of the rearward end wall of the housing.

Angular movement of the pawl 71 about its pivot sleeve 72 is limited by the engagement of an integral lug 79 on the pawl with the upper and lower ends of the slots 47 formed in the flanges 44 and 46 comprising the rearward wall of the housing.

The opposite end of the pawl 71 is provided with a downwardly depending tongue 81 adapted to engage the teeth 56 of the rotor 54 to block clockwise rotation of the latter. An apertured tab 82 is also provided on the pawl 71 and receives the lower end 83 of a control rod 84, the upper end 86 of which is received within an aperture formed in the crank arm 87. The crank arm 87 is nonrotatably secured to the inner end 88 of a key actuated lock cylinder 89 mounted in suitable openings formed in the outer panel 13 and reinforcing plate 34 of the luggage compartment door 11.

From the foregoing it will be seen that to unlock and unlatch the latch mechanism it is only necessary to insert the key into the lock cylinder 89 and rotate the latter to rotate the crank arm 87 and, by means of the control rod 84, swing the pawl 71 upwardly about its pivot 72. This releases the tongue 81 of the pawl from locking engagement with the adjacent tooth 56 of the rotor 54, and permits clockwise rotation of the rotor to release the locking bar 57 of the striker and enable the luggage compartment door to be opened.

When the key is removed from the lock cylinder the pawl is returned by the spring 76 to a position in engagement with the teeth of the rotor 54 so as to be in position for subsequent locking and latching of the mechanism when the luggage compartment door is closed. During the closing movement of the luggage compartment door, which is conventionally pivoted to the vehicle body about its forward edge (not shown), the rearward portion of the door is moved downwardly so that the locking bar 57 of the striker protrudes into the slot 43 of the housing and into engagement with one of the teeth 56 of the rotor 54. The final closing movement of the door moves the parts to the positions shown in Figures 1 and 2, in which the pawl is in engagement with one of the teeth of the rotor while another tooth thereof is in locking relationship with the locking bar of the striker. The teeth 56 of the rotor are hook-shaped and cooperate with the striker bar 57 to draw the luggage compartment door toward rocker panel 19 and thus increase the structural strength of the body.

It will be understood that the invention is not to be limited to the exact construction shown and described, but that various changes and modifications may be made without departing from the spirit and scope of the invention, as defined in the appended claims.

What is claimed is:

1. A latch mechanism for a motor vehicle luggage compartment door having separated inner and outer panels closed by an end wall adjacent their lower ends and arranged to cooperate with a fixed body structure upon which is mounted a striker having a generally horizontal transversely extending striker bar, comprising a housing having generally parallel side walls adapted to extend vertically and longitudinally of the vehicle, upper flanges integral with said walls and extending laterally outwardly therefrom for attachment to the end wall of said luggage compartment door, said side walls having laterally aligned slots therein extending from the bottom of said housing upwardly to an intermediate portion thereof to receive the striker bar upon the closing of said luggage compartment door, a multi-toothed rotor within said housing mounted for rotation about a horizontal transversely extending axis and having at least one tooth thereof projecting into the space between said slots for engagement by the striker bar, a pawl within said housing above said rotor pivotally mounted on a horizontal transversely extending axis and having a tongue engaging said toothed rotor to hold the latter in latching position, actuating means adapted to project through the end wall of the door extending into said housing and connected to said pawl to swing the latter out of engagement with said rotor, said housing having a closed rearward end wall projecting downwardly below the upper ends of said slots to shield the striker bar when the latter is in engagement with said rotor.

2. The structure defined by claim 1 which is further characterized in that said side walls have integral flanges at their forward edges bent laterally in overlapping relationship to form a closed forward wall for the housing, said last mentioned overlapping flanges being adapted to have their upper marginal portions extend adjacent the inner panel of the door for attachment thereto, and said side walls having a laterally disposed web integral with said side walls at their lower edges to form a lower wall for the housing closed except for the opening formed by said slots in said side walls.

3. A latch mechanism for a motor vehicle luggage compartment door having separated inner and outer panels closed by an end wall adjacent their lower ends and arranged to cooperate with a fixed body structure upon which is mounted a generally vertically extending striker having transversely spaced forwardly bent bifurcations joined integrally at their upper ends by a horizontal transversely extending striker bar located above and forwardly of the main body portion of the striker, comprising a housing of substantially closed box form adapted to depend from the end wall of the luggage compartment door and be secured thereto in a central location transversely of the door and in longitudinal alignment with said striker bar, a transversely extending pivot shaft extending through said housing and secured to the opposite side walls thereof, a multi-toothed rotor pivotally mounted upon said shaft, a second pivot shaft extending between the opposite side walls of said housing above said first mentioned shaft, a pawl pivotally mounted upon said second pivot shaft, said pawl having a forwardly extending arm portion projecting over said rotor and a downwardly depending tongue engageable with the teeth of said rotor, a wire spring member looped around said second mentioned pivot shaft on opposite sides of said pawl to center said pawl within the housing, said spring having a forwardly extending bight engaging the arm portion of said pawl to urge the latter downwardly toward said rotor, said pawl also having a rearwardly projecting tongue extending into a slot formed in the rear wall of said housing to limit the rotation of said pawl and also to assist in centering said pawl between the opposite side walls of said housing for vertical alignment with said rotor, actuating means adapted to project through the end wall of the luggage compartment door extending into said housing and connected to the arm portion of said pawl to swing the latter out of engagement with said rotor, said housing having a generally vertically extending slot extending through the bottom and side walls of said housing to expose one tooth of said rotor and to receive the striker bar of said striker for engagement with said tooth when the luggage compartment door is moved to its closed position, and the rear wall of said housing having a downwardly depending flange projecting into the space between the bifurcated portions of said striker to shield said striker bar and said rotor from an unauthorized manipulation.

References Cited in the file of this patent

UNITED STATES PATENTS

| | | |
|---|---|---|
| 648,120 | Brown | Apr. 24, 1900 |
| 2,634,148 | Dingman et al. | Apr. 7, 1953 |